US005326063A

United States Patent [19]

Stevens

[11] Patent Number: 5,326,063

[45] Date of Patent: Jul. 5, 1994

[54] SWING-AWAY JOYSTICK ASSEMBLY

[75] Inventor: Rex W. Stevens, Clovis, Calif.

[73] Assignee: Quickie Designs Inc., Fresno, Calif.

[21] Appl. No.: 906,563

[22] Filed: Jun. 30, 1992

[51] Int. Cl.[5] .............................................. F16M 11/08

[52] U.S. Cl. .................................... 248/282; 248/561; 248/585

[58] Field of Search ..................... 248/282, 289.3, 585, 248/561; 180/65.1, DIG. 907; 280/304.1

[56] References Cited

U.S. PATENT DOCUMENTS

| | | | |
|---|---|---|---|
| 913,049 | 2/1909 | Pieper | 248/585 |
| 1,711,768 | 5/1929 | Bausch et al. | 248/585 |
| 1,960,939 | 5/1934 | Hansen | 248/585 |
| 2,102,078 | 12/1937 | Kemp | 248/282 |
| 3,268,200 | 8/1966 | Eicher | 248/585 |
| 4,951,766 | 8/1990 | Basedow et al. | 180/65.1 |

*Primary Examiner*—Eugenia Jones
*Assistant Examiner*—Allan M. Schrock
*Attorney, Agent, or Firm*—Flehr, Hohbach, Test, Albritton & Herbert

[57] ABSTRACT

A swing-away joystick mounting assembly (20) for mounting a joystick (12) to a wheelchair frame member (11). The joystick mounting assembly (20) produces pantographic movement of the joystick device (12) between a retracted position and an extended position to adjust the placement of the joystick (12). Ingress and egress to and from the wheelchair are eased while, further, permitting the wheelchair to be moved closer to a table or desktop (14). A pair of arms (24, 24′) are pivotally mounted at first ends (25, 25′) to a first mounting mechanism (21) at spaced apart locations and pivotally mounted at second ends (26, 26′) to a second mounting mechanism (22) at spaced apart locations. This four-bar configuration produces pantographic movement of the second mounting mechanism with the joystick device (12) carried thereby between the retracted position and the extended position. A latch mechanism (27) releasably secures the arms (24, 24′) together in either the retracted position or the extended position. A spring biasing mechanism (30) biases the arms (24, 24′) toward an intermediate position from both the retracted position and the extended position. This permits one-handed operation of the mounting assembly (20) because the user will not be required to simultaneously disengage the latch mechanism (27) and commence movement of the assembly (20) from either the fully retracted or fully extended position.

12 Claims, 4 Drawing Sheets

SWING-AWAY JOYSTICK ASSEMBLY

TECHNICAL FIELD

The present invention relates, generally, to joystick assemblies and, more particularly, to adjustable joystick mounting assemblies for wheelchairs.

BACKGROUND ART

Electric powered wheelchairs are generally controlled by joystick assemblies, operably coupled to electric drive motors, which permit an operator to accelerate, steer and brake the wheelchair from an operating position. Because some wheelchair occupants are severely impaired, physically, conventional vehicle steering means are often inappropriate and difficult to operate for these individuals. Joysticks, on the other hand, allow those severely impaired to operate the movement of the wheelchair simply by positioning a joystick knob with one hand in the desired direction of movement of the wheelchair.

Preferably, the joystick device is optimally located where the operator can comfortably rest their arm on the wheelchair armrest from the operating position and operate the joystick knob free of discomfort. This position generally places the joystick knob just forward of the front portion of the armrest at a height where the joystick may be operated by the user while seated in the operating position. Such a position optimally places the joystick knob for accessibility permitting the user to rests their arm on the wheelchair armrest.

The joystick is often mounted to a distal end of an elongated rod member which is disposed alongside the wheelchair armrest or a side portion of the wheelchair frame. This rod member is releasably coupled to a bracket member mounted to the armrest or the wheelchair frame member and formed to slidably receive the rod member. Hence, the rod member and the joystick carried thereby can slide forward, away from the armrest, or rearward, toward the armrest, in a direction along the longitudinal axis of the rod member for length adjustment purposes.

While these joystick mounting assemblies have been adequate to adjust the location of the joystick device along the longitudinal axis of the rod member, several operational problems are inherent in these designs. A locking mechanism, to secure the rod member relative to the bracket member, must be loosened, usually by turning a knob, in order to permit the rod member to slide forward or rearward. Subsequently, the latch mechanism must be tightened in order to retain the positioning of the joystick device. Moreover, to move the joystick each time, this sequence of events must be repeated which tends to be difficult and laborious to those severely impaired.

Another problem that has been encountered in connection with these prior art joystick mounting assemblies is that the mounting assembly always positions the joystick device forward of the armrest. Because of the occupant's limited mobility while seated in the operating position, it is often desirable to position the wheelchair as close as possible to working table, office desk or the like for greater access, convenience and practical working environment. Thus, in situations where the table is placed at a height similar to that of the joystick device, the wheelchair may only be moved as close to the table as the joystick device will permit. Traditional joystick mounting assemblies may be retracted somewhat in the direction along the longitudinal axis of the rod member; however, without removal of the joystick, the joystick device is still positioned between the armrest and the table.

Finally, ingress and egress to and from the operating position of the wheelchair is more difficult since the joystick device projects forward from the armrest which impairs passage to the wheelchair seat.

DISCLOSURE OF INVENTION

Accordingly, it is an object of the present invention to provide a joystick mounting assembly which permits a wheelchair assembly to be moved closer to a table, desk or the like.

It is another object of the present invention to provide a joystick mounting assembly which promotes ingress and egress to and from the wheelchair assembly.

Still another object of the present invention is to provide a joystick mounting assembly which releasably locks in both the retracted and extended position.

Another object of the present invention is to provide a joystick mounting assembly which permits one-handed operation to retract or extend a joystick device mounted thereon.

Yet another object of the present invention is to provide a joystick mounting assembly which may be retrofit to wheelchair assemblies.

It is a further object of the present invention to provide a joystick mounting assembly which is durable, compact, easy to maintain, has a minimum number of components, is easy to use by unskilled personnel, and is economical to manufacture.

The present invention includes a swing-away joystick mounting assembly for mounting a joystick to a frame member. The mounting assembly comprises a first mounting mechanism formed for mounting to the frame member and a second mounting mechanism formed to carry the joystick. A pair of arms are pivotally mounted at first ends to the first mounting mechanism at spaced apart locations and pivotally mounted at second ends to the second mounting mechanism at spaced apart locations. The pair of arms are mounted to the first mounting mechanism and the second mounting mechanism at locations producing pantographic movement of the second mounting mechanism with the joystick carried thereby between a retracted position and an extended position. A latch mechanism is coupled between the pair of arms for releasably securing the pair of arms with the second mounting mechanism in a selected one of the retracted position and the extended position. A spring biasing mechanism is coupled between the latch mechanism and one of the arms for biasing the pair of arms toward an intermediate position from both the retracted position and the extended position.

Accordingly, the present invention provides a joystick mounting assembly permitting pantographic movement of the joystick between the retracted position and the extended position to adjust the placement of the joystick without changing its angular orientation relative to the wheelchair. This eases ingress and egress to and from the wheelchair while, further, permitting the wheelchair to be moved closer to a table or desktop using joystick displacement in the same direction as would be used if the joystick were in its normal operating position. Moreover, the joystick mounting assembly of the present invention permits one-handed operation to extend or retract the assembly.

The apparatus of the present invention has other objects and features of advantage which will be more readily apparent from the following description of the Best Mode of Carrying Out the Invention and the appended claims, when taken in conjunction with the accompanying drawing.

BRIEF DESCRIPTION OF THE DRAWING

The purpose and advantages of the present invention will be apparent to those skilled in the art from the following detailed description in conjunction with the appended drawings in which.

BEST MODE OF CARRYING OUT THE INVENTION

The swing-away joystick mounting assembly of the present invention pantographically retracts the joystick device to a position lateral to the wheelchair armrest to accord the wheelchair occupant closer access to a table or desk when seated in the operating position. While the present invention will be described with reference to a few specific embodiments, the description is illustrative of the invention and is not to be construed as limiting the invention. Various modifications to the present invention can be made to the preferred embodiments by those skilled in the art without departing from the true spirit and scope of the invention as defined by the appended claims.

Figure 1:
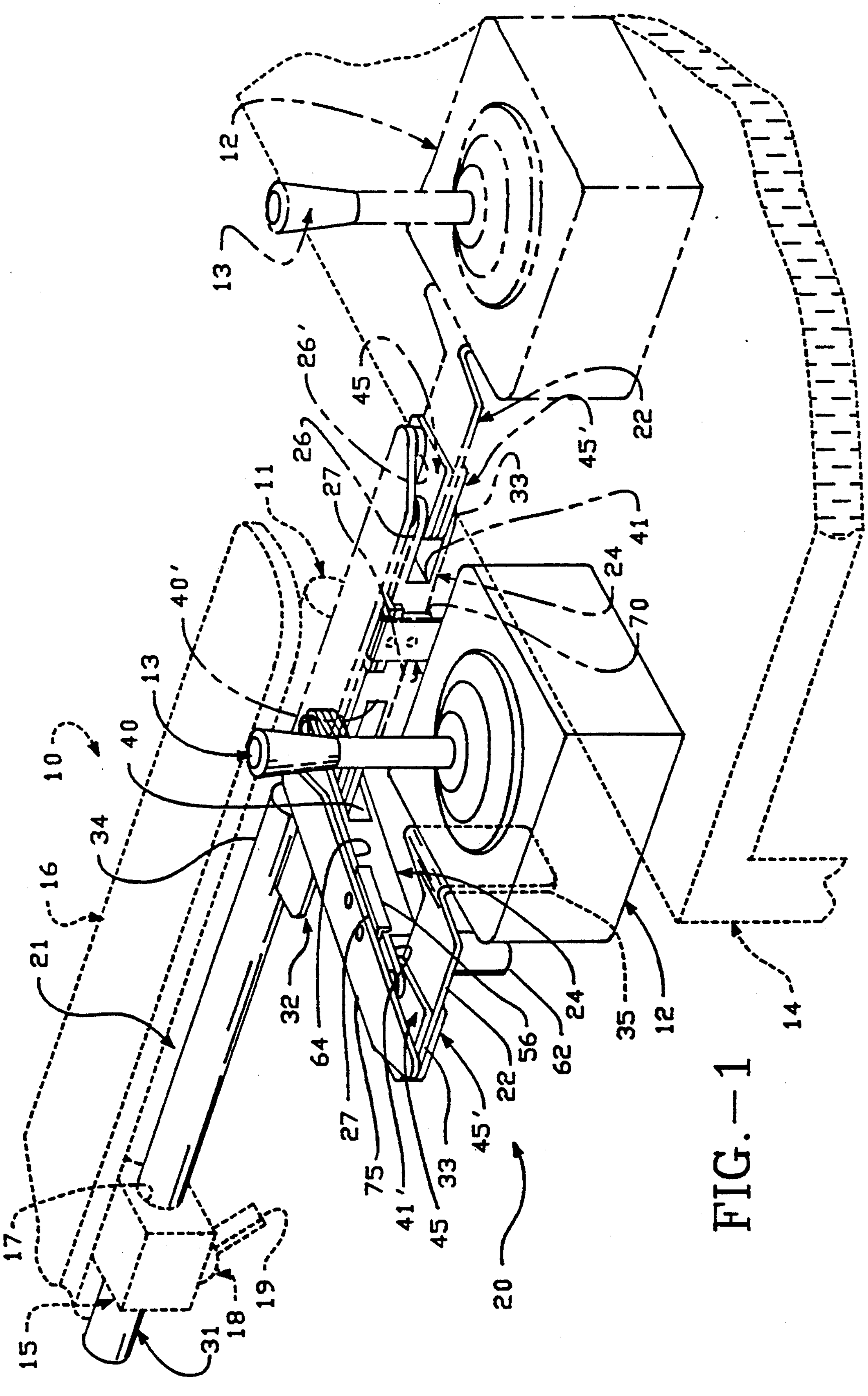
FIG. 1 is a top perspective view of a swing-away joystick mounting assembly constructed in accordance with the present invention and mounted to a wheelchair frame shown in broken lines with an armrest mounted thereto.

It will be noted here that for a better understanding, like components are designated by like reference numerals throughout the various figures. Attention is now directed to FIG. 1, where a swing-away joystick mounting assembly, generally designated 20, is illustrated mounted to a portion of a wheelchair frame member 11 (shown in broken lines) of wheelchair assembly 10. Briefly, joystick mounting assembly 20 of the present invention includes a first mounting means, generally designated 21, formed for mounting to frame member 11 and a second mounting means, generally designated 22, formed to carry a joystick device 12 therefrom. A pair of arms, generally designated 24 and 24', are pivotally mounted at first ends 25 and 25' (FIGS. 2A–2C), respectively, to first mounting means 21 at spaced apart locations. Similarly, pair of arms 24 and 24' are pivotally mounted at second ends 26 and 26', respectively, to second mounting means 22 at spaced apart locations. This configuration, essentially a four-bar pantographic linkage assembly as will be described in greater detail below, produces pantographic movement of second mounting means 22 with joystick device 12 carried thereby between a retracted position (solid lines in FIG. 1) and an extended position (phantom lines in FIG. 1). The pantographic motion of second mounting means 22 causes joystick device 12 to swing away along an arcuate path to a position of retraction lateral to wheelchair frame member 11 without changing its angular orientation relative to the wheelchair. Therefore, wheelchair 10 may be positioned closer to a table 14 or the like. Additionally, ingress and egress to and from wheelchair 10 may be eased by positioning joystick device 12 away from the entrance to the wheelchair seat (not shown).

Figure 2A:
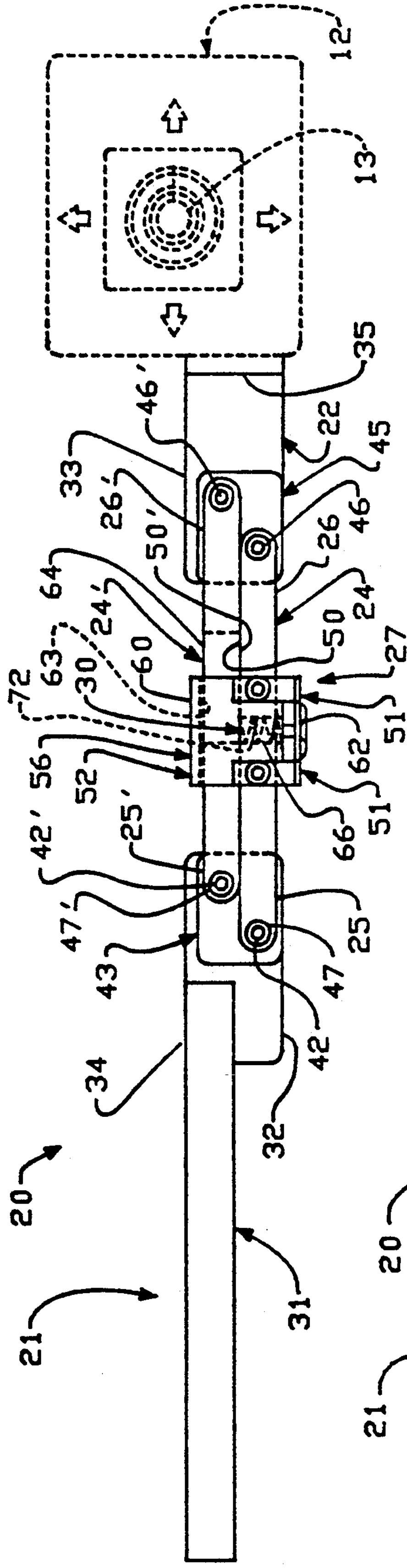
FIGS. 2A through 2C shows a series of top plan views of the joystick mounting assembly of FIG. 1 moving between an extended position and a retracted position.
Figure 2B:
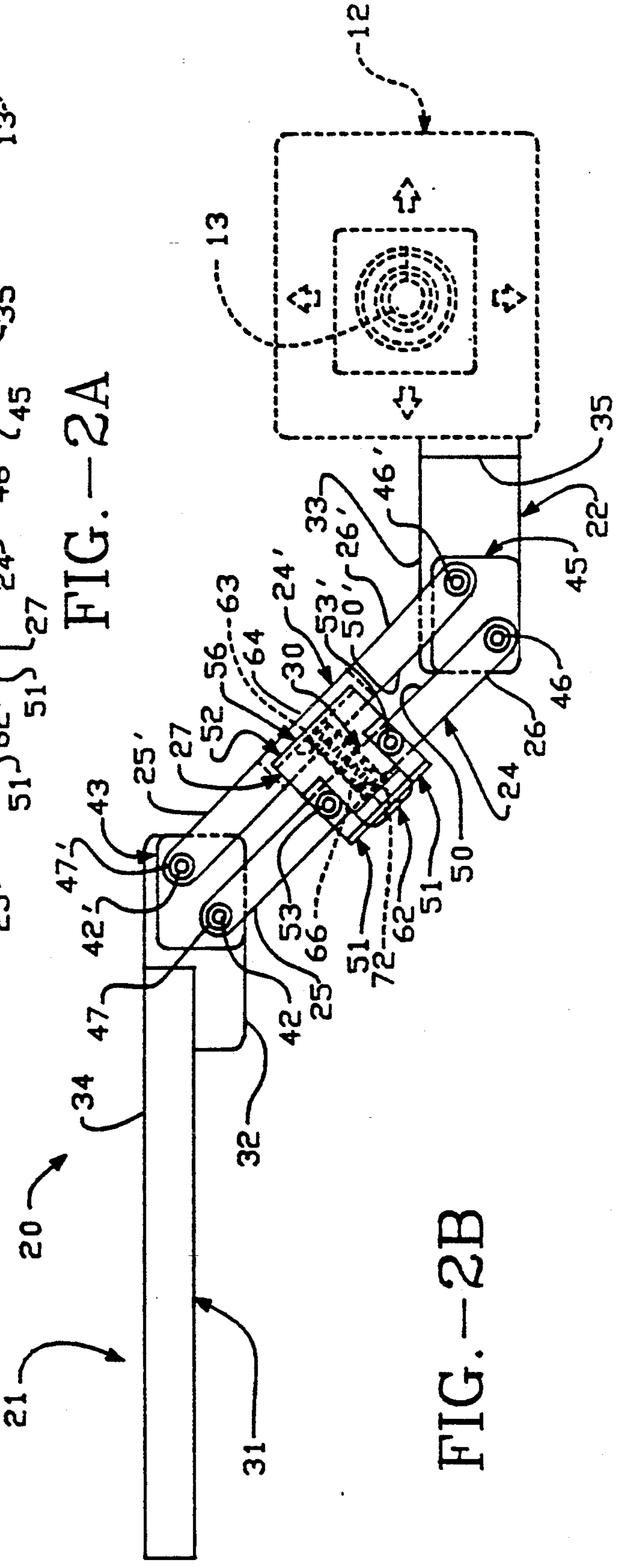
Figure 2C:
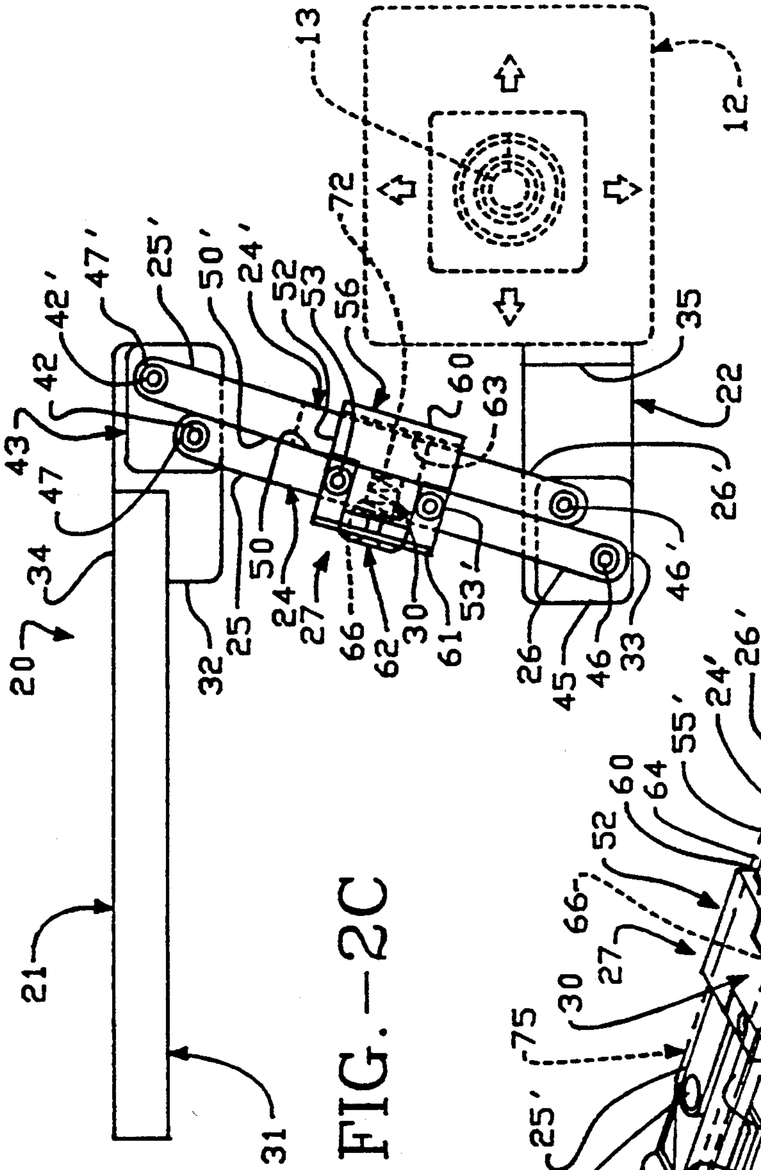
Figure 3A:
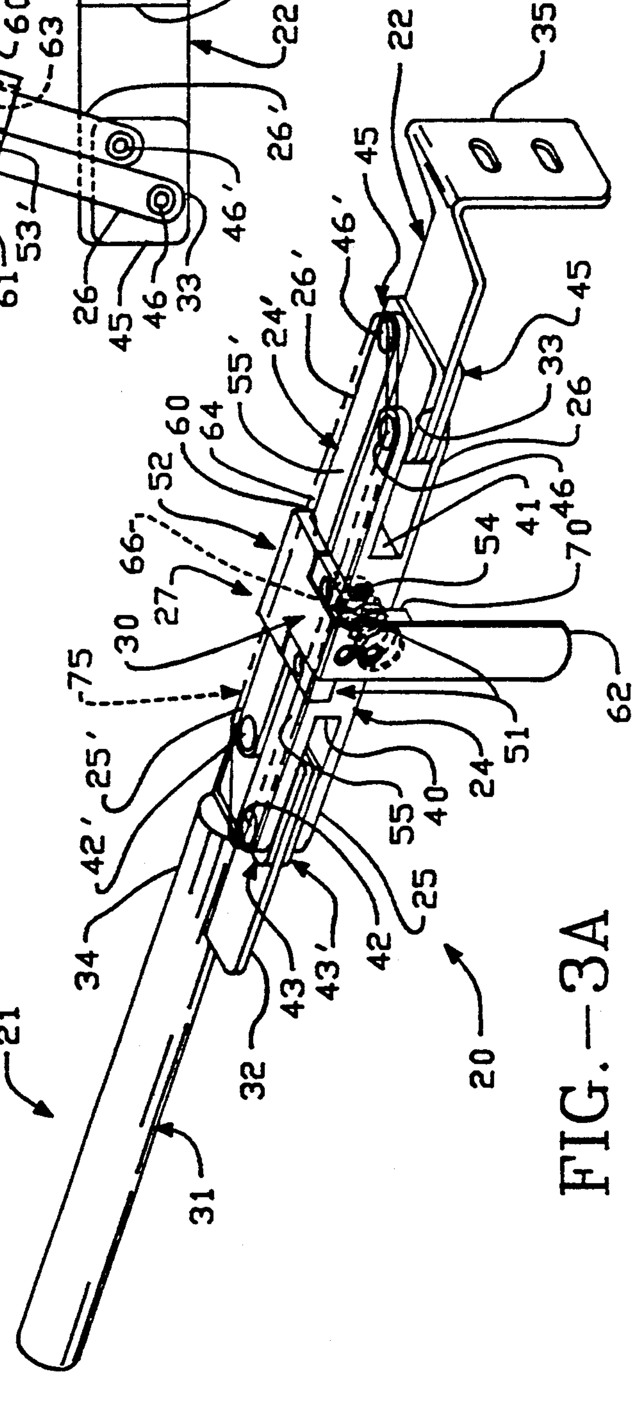
FIGS. 3A through 3C show a series of top perspective views of the joystick mounting assembly of FIG. 1 illustrating the operation of a locking mechanism.

Briefly, a latch mechanism 27 is coupled between the pair of arms 24 and 24' for releasably securing arms 24 and 24' together in either the retracted position (FIGS. 2C and 3C) or the extended position (FIGS. 2A and 3A). Latch mechanism 27 also enables joystick device 12 to be secured relative wheelchair frame member 11 during normal operational use (extended position) or temporary storage and limited use (retracted position). A spring biasing mechanism 30 is coupled between latch mechanism 27 and one of the arms for biasing pair of arms 24 and 24' toward an intermediate position (FIGS. 2B, 3B and 4) from both the retracted position and the extended position. Hence, when latch mechanism 27 is released from the locked position (i.e., either the retracted position or the extended position), spring biasing mechanism 30 strongly urges arms 24 and 24' toward the intermediate position of FIGS. 2B and 3B. This facilitates one-handed operation of the pantographic linkage by the user to move joystick device 12 along the arcuate path. This operation is particularly important because it is often extremely difficult for those severely impaired to commence movement of assembly 20 from either the fully extended or retracted positions. Hence, by automatically positioning assembly 20 toward the intermediate position (via spring mechanism 30) when latch mechanism 27 is disengaged, the user can more easily extend or retract the linkage to the desired position.

Turning now to FIGS. 2A–2C, joystick mounting assembly 20 will be described in greater detail. Wheelchair frame member 11 is formed to support or carry an armrest member 16 (FIG. 1) mounted atop frame member 11. As above indicated, it is desirable to position joystick knob 13, during operation, at a height where the user may operate joystick device 12 comfortably while resting their arm on armrest member 16. Typically, the prior art joystick mounting assemblies are mounted to frame member 11 adjacent armrest 16. Joystick mounting assembly 20 of the present invention, likewise, is slidably mounted to wheelchair frame member 11 adjacent armrest member 16 so that joystick device 12 may be placed at a substantially similar operating position. Accordingly, mounting assembly 20 of the present invention may be retrofit to most existing wheelchairs employing joysticks.

As shown, first mounting means 21 includes an elongated hollow rod member 31 having a first mounting plate 32 disposed on one distal end 34 thereof proximate the front portion of wheelchair 10. A frame member mounting bracket 15, affixed to a side portion of frame member 11, slidably mounts rod member 31 adjacent armrest 16. Mounting bracket 15 provides a passageway 17 (FIG. 1) formed to receive the opposite end of rod member 31 to permit relative slidable movement therebetween along a longitudinal axis of rod member 31. Accordingly, second mounting means 22 and joystick device 12 carried thereby, which are coupled to first mounting plate 32, may be moved along the longitudinal axis of rod member 31 to adjust the position of joystick knob 13 relative to armrest member 16.

A securing device 18, coupled to mounting bracket 15, releasably secures rod member 31 against mounting bracket 15 to prevent slidable movement therebetween.

Securing device 18 includes a knob member 19 movable between a secured position and a released position which enables rod member 31 to be secured or moved relative to frame member mounting bracket 15. It will be understood that the means for mounting rod member 31 to frame member 11 is broadly old and does not constitute a novel aspect of the present invention.

Second mounting means 22 is preferably a mounting bracket member formed to carry joystick device 12 therefrom. Bracket member 22 includes a second mounting plate portion 33, in which second arm ends 26 and 26′ are pivotally mounted thereto, and a joystick mounting end 35 formed to be secured to a side wall of joystick device 12 by mounting fasteners (not shown).

In the preferred form, first ends 25 and 25′ of arms 24 and 24′ provide first channels 40 and 40′ (FIGS. 3A-3C) extending laterally therethrough. Each first channel 40 and 40′ is formed and dimensioned to receive first mounting plate 32. First channels 40 and 40′ extend into first ends 25 and 25′ by a distance sufficient to permit arms 24 and 24′ to pivot about first mounting plate 32 free from obstruction. Likewise, second ends 26 and 26′ of arms 24 and 24′ provide second channels 41 and 41′ extending laterally therethrough. Each second channel 41 and 41′ is formed and dimensioned to receive second mounting plate 33.

Second channels 41 and 41′ extend into second ends 26 and 26′, similarly, by a distance sufficient to permit arms 24 and 24′ to pivot about second mounting plate 33 free from obstruction.

First ends 25 and 25′ are pivotally mounted to first mounting plate 32 in a manner similar to the pivotal mounting of second ends 26 and 26′ to second mounting plate 33. Thus, for the ease of description, only one mounting end side will be described in great detail.

First ends 25 and 25′ of arms 24 and 24′ are pivotally mounted to first mounting plate 32 by first pivotal pins 42 and 42′ extending through vertically aligned apertures 47 and 47′ provided in both first ends 25 and 25′ and first mounting plate 32. Arms 24 and 24′, and hence second mounting means 22, pivot about pins 42 and 42′ which are preferably oriented substantially vertical. Accordingly, arms 24 and 24′ pivot about first pivotal pins 42 and 42′ in a substantially horizontal plane.

Figure 3B:
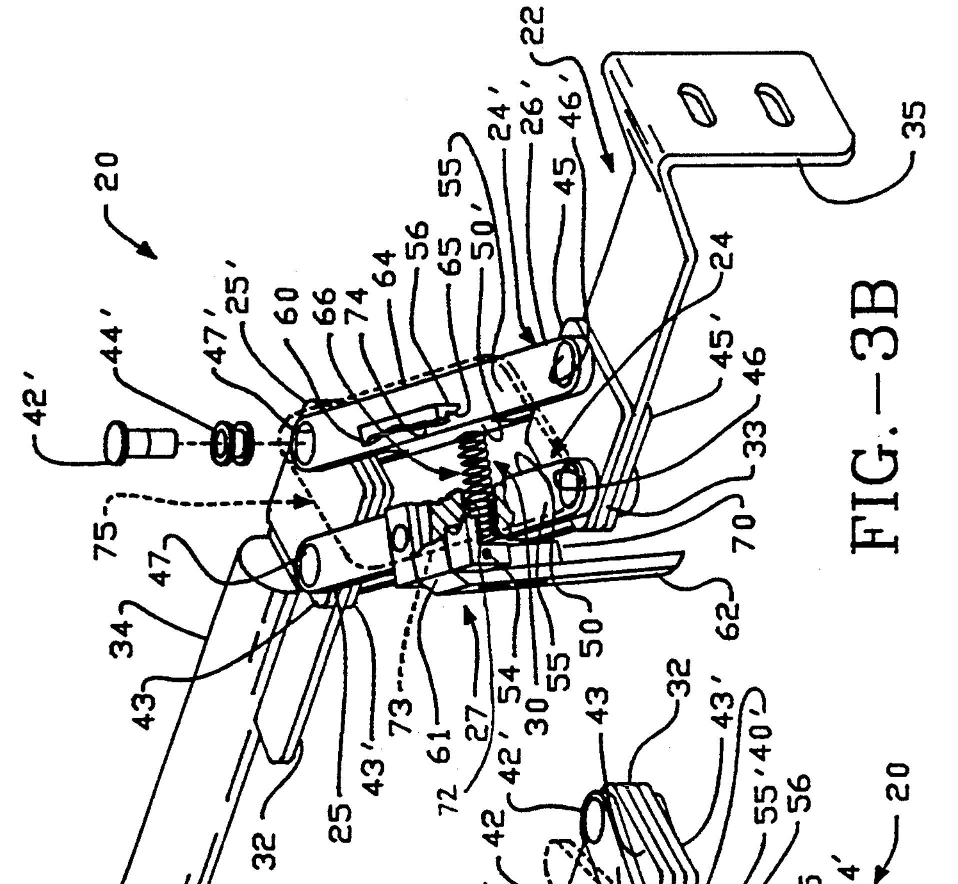
Figure 3C:
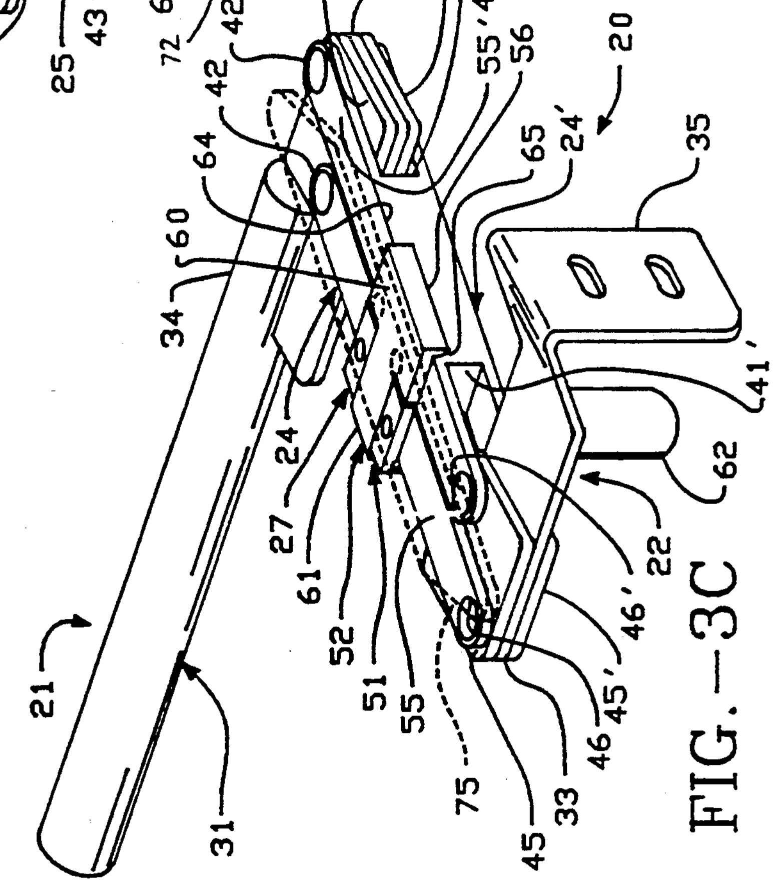

As best viewed in FIGS. 3A-3C, first spacer members 43 and 43′ are provided between first mounting plate 32 and first ends 25 and 25′. First spacer members 43 and 43′ reduce friction and shimmy between arms 24 and 24′ and first mounting plate 32 as arms 24 and 24′ pivot about pins 42 and 42′. Preferably, both upper spacer member 43 and lower space member 43′ plate-like members composed of a friction reducing or flexible material such as graphite, plastic or the like.

First mounting plate 32 is sandwiched between upper and lower spacer members 43 and 43′, respectively. This unit is to be inserted into first channels 40 and 40′ provided laterally in first ends 25 and 25′, as illustrated in FIGS. 3A and 3C. Therefore, when arms 24 and 24′ pivot about pins 42 and 42′, respectively, first ends 25 and 25′ contact upper and lower spacer members 43 and 43′ which reduce friction and wear therebetween. It will be understood, of course, that the thickness of first spacer members 43 and 43′ may vary depending on the tolerances and specifications.

It is desirable to maintain a constant axial force on first ends 25 and 25′ against spacer members 43 and 43′ so that the pivotal joints at first pivotal pins 42 and 42′ maintain their integrity. However, as first spacer members 43 and 43′ wear with time and usage, the pivotal joints tend to loosen axially. As shown in FIG. 3B, disc spring washers 44′ are preferably employed to maintain a constant axial force on pins 42 and 42′ during pantographic motion of arms 24 and 24′. Disc spring washers 44′, well known in the art, are particularly advantageous in that as the pivotal joints wear, spring washer 44′ compensates by providing a constant axial force acting on first pivotal pins 42 and 42 so that the pivotal joints will not substantially loosen with time.

As above indicated, second ends 26 and 26′ of arms 24 and 24′ are pivotally mounted to second mounting means 22 in a substantially similar fashion that first ends 25 and 25′ are mounted to first mounting means 21. Briefly, second mounting plate 33, sandwiched between spacer members 45 and 45′, is inserted into second channels 41 and 41′ of second ends 26 and 26′, respectively. Spaced apart second pivotal pins 46 and 46′ extend through apertures provided in both second ends 26 and 26′ and mounting plate 33 so that arms 24 and 24′ pivot about second pivotal pins 46 and 46′.

Preferably, outer arm 24 and inner arm 24′ are substantially similar in length, as may be seen in the intermediate position of FIGS. 2B and 3B. Further, first pivotal pins 42 and 42′ and second pivotal pins 46 and 46′ are spaced apart diagonally relative first mounting plate 32 and second mounting plate 33, respectively, in substantially similar diagonal orientations. This configuration pivotally mounts outer arm 24 and inner arm 24′ substantially parallel to one another between first mounting means 21 and second mounting means 22 at locations producing pantographic movement of second mounting means 22. Moreover, parallel mounted arms 24 and 24′ cooperate to move joystick device 12, while maintaining substantially the same orientation, arcuately between the retracted position (FIG. 2C) and the extended position (FIG. 2A). This allows the wheelchair user to move the chair using joystick 12 by displacing the joystick in the same direction in both the operating and stored positions.

Because of the diagonal positioning of first and second pivotal pins 42, 42′ and 46, 46′, when mounting assembly 20 is positioned in the fully extended position, the inner facing side wall 50 of outer arm 24 engages the inner facing side wall 50′ of inner arm 24′. FIG. 2A illustrates that this interengagement therebetween prevents further pivotal motion of arms 24 and 24′ in the counter clockwise direction. In the preferred form, this fully extended position also coincides with aligning arms 24 and 24′ in the direction substantially along the longitudinal axis of rod member 31.

To retract mounting assembly 20 to the retracted position (FIG. 2C), arms 24 and 24′ move pivotally about first pivotal pins 42 and 42′ in the clockwise direction until inner facing side walls 50 and 50′ again engage one another (FIG. 2C). Similar to the extended position, engagement between inner facing side walls 50 and 50′ engagement prevents further retraction in the clockwise direction. The degree of retraction is a function of the spacing between arms 24 and 24′ as well as the diagonal orientation between first pivotal pins 42 and 42′, and between second pivotal pins 46 and 46′. Moreover, it will be understood that should joystick mounting assembly 20 be mounted to the opposite side of the wheelchair seat (not shown), the diagonal orientation of first and second pivotal pins 42, 42′ and 46, 46′ relative to first mounting means 21 and second mounting means 22, respectively, would be reversed so that arms 24 and 24′ could rotate counter clockwise about first pivotal pins 42 and 42′ from the extended position to the retracted position.

Accordingly, the joystick mounting assembly 20 of the present invention pantographically retracts joystick device 12 to the position lateral (retracted position) to wheelchair armrest 16. This accords the wheelchair occupant closer access to table 14 when seated in the operating position, as illustrated in FIG. 1. Moreover, the mounting assembly 20 of the present invention enables accurate repositioning of joystick device 12, and hence knob 13, back to the extended position without the need to readjust rod member 31 relative to frame member mounting bracket 15, contrary to the prior art assemblies. Finally, ingress and egress to and from wheelchair 10 may be eased by positioning joystick device 12 away from the wheelchair seat entrance to the retracted position.

In another aspect of the present invention, latch mechanism 27, engageable with outer arm 24 and inner arm 24′, releasably secures arms 24 and 24′, and hence, joystick device 12 in either the retracted position (FIG. 3A) or the extended position (FIG. 3C). As previously mentioned, in both the retracted position and the extended position, inner facing side walls 50 and 50′ of arms 24 and 24′, respectively, are interengaged to prevent further motion therebetween in the respective direction. Accordingly, latch mechanism 27 locks inner and outer arms 24 and 24′ together to prevent further movement of joystick device 12 until latch mechanism 27 is released.

As best shown in FIGS. 2A–2C and 3A–3C, latch mechanism 27 includes a base member 51, mounted to an upper surface 54 of outer arm 24, and a locking member 52, pivotally mounted to base member 51. Base member 51 preferably includes two L-shaped base members 51 mounted to outer arm 24 on opposite sides of locking member 52 by fasteners 53 and 53′. A pivotal locking pin 54 extends laterally through L-shaped base members 51, and locking member 52, in a direction parallel to the longitudinal axis of outer arm 24. This enables locking member 52 to pivot thereabout between a locking position (FIGS. 3A and 3C) and a released position (FIGS. 2B and 3B).

Locking member 52 is disposed across upper surfaces 55 and 55′ of both outer arm 24 and inner arm 24′, respectively. A lip portion 56, positioned to engage inner arm 24′, as best viewed in FIG. 3B, extends downwardly from one end 60 of locking member 52. Extending downwardly from the opposite end 61 of locking member 52 is a lever arm 62 of sufficient length to enable manual disengagement of locking member 52.

Lip portion 56 includes a wall 63 formed and dimensioned to releasably engage an edge portion 64 of inner arm 24 when outer arm 24 and inner arm 24 are positioned in either the retracted position or the extended position. In this orientation, wall 63 of lip portion 56 engages edge portion 64 of inner arm 24 to retain arms 24 and 24′ together. As shown in FIGS. 3A and 3C, outer arm 24 and inner arm 24′ are gripped between lip portion 56 and L-shaped base members 51 which substantially prevents further pivotal motion of arms 24 and 24′ about first pivotal pins 42 and 42′. Accordingly, the channel provided between lip portion 56 of locking member 52 and L-shaped base members 51 preferably conforms, substantially, to the traverse cross-section of upper surfaces 55 and 55′ of outer arm 24 and inner arm 24′, respectively, when positioned in either the extended position or the retracted position.

Only upon release of locking member 52, manually actuated by lever arm 62, can arms 24 and 24′ be pivotally moved about first pivotal pins 42 and 42′. As best shown in FIGS. 2B and 3B, when lever arm 62 is moved inwardly toward inner arm 24, locking member 52 pivotally moves lip portion 56 upwardly about locking pin 54 (FIG. 3A and 3B) so that lip portion 56 can clear edge portion 64 of inner arm 24 and come to rest atop upper surface 55′ of inner arm 24. Arms 24 and 24′ are then free to move pivotally about first pivotal pins 42 and 42′ to retract or extend joystick device 12.

When arms 24 and 24′ are pivotally moved between the extended and retracted positions, locking member 52 is not engaged with arms 24 and 24′ to lock the same together. FIGS. 2A and 2C illustrate that because locking member 52 is coupled to outer arm 24, lip portion 56 moves arcuately across upper surface 55′ of inner arm 24 between first end 25′ (extended position) and second end 26′ (retracted position). Accordingly, as mounting assembly 20 is moved to either the retracted position or the extended position, arms 24 and 24′ move close enough together to permit locking member 52 to pivot downwardly so that lip portion 56 can engage edge portion 64 of inner arm 24′. Hence, as upper surfaces 55 and 55′ are received by the channel between lip portion 56 and L-shaped base members 51, arms 24 and 24′ become releasably locked together.

To facilitate engagement between lip portion 56 and edge portion 64 so that locking member 52 can move to the locked position, lip portion 56 includes a bevelled edge 65 extending along a bottom portion thereof. As shown in FIG. 3B, bevelled edge 65 is angularly inclined inwardly toward edge portion 64 to guide and direct edge portion 64 into engagement with wall 63.

It will be appreciated that latch mechanism 27 could just as easily been mounted to a lower surface of outer arm 24 without departing from the true spirit and nature of the present invention.

In accordance with the present invention, spring biasing mechanism 30 is provided between arms 24 and 24′ to urge arms 24 and 24′ apart when positioned in both the extended and retracted positions. Upon release of locking member 52 from the locked position, spring biasing mechanism 30 moves inner facing side wall 50 of outer arm 24 away from inner facing side wall 50′ of inner arm 24′ drawing mounting assembly toward the intermediate position. From this position, as mentioned above, the user can more easily move mounting assembly 20 to either the extended position or the retracted position.

In the preferred embodiment, spring biasing mechanism 30 includes a compression spring 66 extending between lever arm 62 and inner arm 24′. As best viewed in FIG. 4, spring 66 is mounted to and extends outwardly from a spring mounting plate 70 affixed to an inward facing surface of lever arm 62. Compression spring 66 passes through a bore 72 (FIGS. 2A–2C and 3B) extending laterally through outer arm 24 to slidably engage inner arm 24′. One end 73 (FIG. 3B) of spring 66 is mounted to spring mounting plate 70 while an opposite end 74 slidably abuts inner facing side wall 50′ of inner arm 24′. Thus, when arms 24 and 24′ move between the retracted position and the extended position, opposite end 74 of spring 66 slides from side-to-side across inner facing side wall 50′ of inner arm 24 as locking member 52 arcuately moves relative to upper surface 55'.

When arms 24 and 24' are locked together in either the extended position or the retracted position, compression spring 66 is compressed together, as shown in FIGS. 2A and 2C. Upon release of locking member 52 from the locked position, compressed spring 66 abutting inner facing side wall 50' urges inner arm 24' away from outer arm 24 to the intermediate position (FIGS. 2B and 3B). Spring 66 biases arms 24 and 24' to the intermediate position from both the locked extended position and the locked retracted position. As mentioned, such biasing facilitates one-handed operation of assembly 20 since the user will not be required to disengage latch mechanism 27 and simultaneously commence movement of the pantographic linkage toward the intermediate position.

Spring biasing mechanism 30 also biases locking member 52 downwardly so that lip portion 56 automatically engages edge portion 64 of inner arm 24' when moved to the extended position or the retracted position. As illustrated in FIG. 3B, the positioning of compression spring 66 relative to pivotal locking pin 54 biases locking member 52 toward the locked position. Accordingly, the bottom end of lip portion 56 engages upper surface 55' of inner arm 24' until arms 24 and 24' are moved to either the extended position or the retracted position wherein compressed spring 66 urges locking member, and hence, lip portion 56 downwardly to engage edge portion 64.

In another aspect of the present invention, a shield member 75, as best shown in FIG. 1, is coupled to an upper portion of locking member 52. Shield member 75 acts to shield the four-bar linkage as arms 24 and 24' move apart and back together between the retracted position and the extended position. Accordingly, shield member 75 reduces potential pinch points or injury to the wheelchair occupant during operational use. Moreover, shield member 75 permits the occupant to rest his arm atop the four-bar linkage while operating joystick device 12 from either the retracted position or the extended position.

What is claimed is:

1. A joystick mounting assembly for mounting a joystick to a frame member, comprising:

first mounting means mounted to the frame member;

second mounting means supporting the joystick;

a pair of arms pivotally mounted at first ends to said first mounting means at spaced apart locations and pivotally mounted at second ends to said second mounting means at spaced apart locations, said pair of arms being mounted to said first mounting means and said second mounting means at said locations to produce pantographic movement of said second mounting means between a retracted position and an extended position;

latch means coupled to said pair of arms for releasably securing said pair of arms with said second mounting means in a selected one of said retracted position and said extended position, said latch means including a base member mounted to one of said pair of arms, and a locking member pivotally mounted to said base member between a locking position and a releasing position, said locking member including a lever portion extending angularly outward from an end of said latch member, and a lip portion disposed on an opposite end of said locking member, said up portion releasably engaging an edge portion of the other arm of said pair of arms when said locking member is moved to said locking position; and spring biasing means coupled between said latch means and the other arm and biasing said pair of arms toward an intermediate position from both said retracted position and said extended position.

2. The joystick mounting assembly as defined in claim 1 wherein, said spring biasing means includes a compression spring mounted between said lever portion and slidably abutting a side wall of said other arm to further bias said latch member toward said locking position.

3. The joystick mounting assembly as defined in claim 2 wherein, said one arm defines an opening extending through a side portion of said one arm, said opening being dimensioned to slidably receive said compression spring.

4. The joystick mounting assembly as defined in claim 1 wherein, said latch means includes a guard plate formed and dimensioned to substantially cover a topside of said pair of arms.

5. The joystick mounting assembly as defined in claim 1 wherein, said pair of arms being mounted at said locations such that said pair of arms remain substantially parallel throughout said pantographic movement.

6. The joystick mounting assembly as defined in claim 5 wherein, said first mounting means includes a first plate member, said first ends of said pair of arms are pivotally mounted about substantially parallel first end axes to said first plate member, and said second mounting means includes a second plate member, said second ends of said pair of arms are pivotally mounted about substantially parallel second end axes to said second plate member.

7. The joystick mounting assembly as defined in claim 6 wherein, said first end axes and said second end axes are substantially vertical.

8. The joystick mounting assembly as defined in claim 7 wherein, said first mounting means further includes an elongated bar member extending outward from said first plate member in a direction away from said pair of arms, and a frame mounting member coupled to the frame member, said frame mounting member defining a channel formed to slidably receive said elongated bar member for movement thereof along the longitudinal axis of said elongated bar member.

9. A swing-away joystick mounting assembly for mounting a joystick to a wheelchair frame supporting a seat, comprising:

extending means having a wheelchair frame mounting end and a joystick mounting end, said extending means movably supporting the joystick carried by said joystick mounting end in pantographic movement between a retracted position proximate said seat and an extended position displaced away from said retracted position and away from said seat;

locking means coupled between said frame mounting end and said joystick mounting end for releasably locking said extending means in a selected one of said retracted position and said extended position; and spring biasing means coupled to said locking means for biasing said extending means toward an intermediate position from both said retracted position and said extended position.

10. A joystick mounting assembly for mounting a joystick to a frame member, comprising;

first mounting means mounted to the frame member;

second mounting means supporting the joystick;

a pair of arms pivotally mounted at first ends to said first mounting means at spaced apart locations and pivotally mounted at second ends to said second mounting means at spaced apart locations, said pair of arms being mounted to said first mounting means and said second mounting means at said locations to produce pantographic movement of said second mounting means between a retracted position and an extended position when moving said joystick in a direction away said frame member;

latch means coupled to said pair of arms for releasably securing said pair of arms with said second mounting means in a selected one of said retracted position and said extended position; and spring biasing means coupled between said latch means and one of said arms and biasing said pair of arms toward an intermediate position from both said retracted position and said extended position.

11. The joystick mounting assembly as defined in claim 10 wherein, said latch means includes a base member mounted to said one arm, and a locking member pivotally mounted to said base member between a locking position and a releasing position, said locking member including a lever portion extending angularly outward from an end of said latch member, and a lip portion disposed on an opposite end of said locking member, said lip portion releasably engaging an edge portion of the other arm of said pair of arms when said locking member is moved to said locking position.

12. The joystick mounting assembly as defined in claim 11 wherein, said spring biasing means includes a compression spring mounted between said lever portion and slidably abutting a side wall of said other arm to further bias said latch member toward said locking position.

* * * * *

UNITED STATES PATENT AND TRADEMARK OFFICE

CERTIFICATE OF CORRECTION

PATENT NO. : 5,326,063

DATED : July 5, 1994

INVENTOR(S) : Rex W. Stevens

It is certified that error appears in the above-identified patent and that said Letters Patent is hereby corrected as shown below:

Column 9, claim 1, line 23, after "said" delete "latch" and insert therefor --locking--, Column 9, claim 1, line 25, after "member, said" delete "up" and insert --lip--.

Column 12, claim 11, line 8, after "said" delete "latch" and insert --locking--.

Signed and Sealed this

Fourth Day of October, 1994

Attest:

BRUCE LEHMAN

*Attesting Officer*

*Commissioner of Patents and Trademarks*